(12) United States Patent
Brown et al.

(10) Patent No.: US 10,948,571 B1
(45) Date of Patent: Mar. 16, 2021

(54) LONG WAVE INFRARED EMITTER SYSTEMS

(71) Applicant: Rockwell Collins, Inc., Cedar Rapids, IA (US)

(72) Inventors: Robert D. Brown, Lake Oswego, OR (US); James H. Stanley, Palo Alto, CA (US); Carlo L. Tiana, Portland, OR (US); Bobby D. Foote, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/114,789

(22) Filed: Aug. 28, 2018

(51) Int. Cl.
| | |
|---|---|
| *G01J 5/12* | (2006.01) |
| *G01S 7/481* | (2006.01) |
| *G01J 5/22* | (2006.01) |
| *G01J 5/08* | (2006.01) |
| *G01S 17/89* | (2020.01) |
| *G01J 5/20* | (2006.01) |

(52) U.S. Cl.
CPC ........... *G01S 7/4814* (2013.01); *G01J 5/0896* (2013.01); *G01J 5/22* (2013.01); *G01S 7/4816* (2013.01); *G01S 17/89* (2013.01); *G01J 2005/202* (2013.01)

(58) Field of Classification Search
CPC ....... G01K 7/02; G01K 7/01; G01J 2005/204; G01J 2005/202; G01J 5/20; H01L 37/00; H01L 35/00
See application file for complete search history.

(56) References Cited

U.S. PATENT DOCUMENTS

| | | | | |
|---|---|---|---|---|
| 5,710,431 | A * | 1/1998 | Spindler | G01J 5/522 250/504 R |
| 5,731,594 | A * | 3/1998 | Kuroda | G01J 3/108 219/553 |
| 5,822,099 | A * | 10/1998 | Takamatsu | H04B 10/1127 398/162 |
| 2003/0063283 | A1* | 4/2003 | DiDomenico | G01M 15/108 356/437 |
| 2008/0204757 | A1* | 8/2008 | Manning | G01J 3/02 356/451 |
| 2009/0161102 | A1* | 6/2009 | Deppermann | G01N 21/253 356/303 |
| 2011/0228811 | A1* | 9/2011 | Fraden | G01J 5/061 374/130 |
| 2018/0017679 | A1* | 1/2018 | Valouch | A63F 13/213 |
| 2018/0191967 | A1* | 7/2018 | Kester | G01J 3/02 |

* cited by examiner

*Primary Examiner* — David P Porta
*Assistant Examiner* — Mamadou Faye
(74) *Attorney, Agent, or Firm* — Suiter Swantz pc llo

(57) ABSTRACT

An infrared emitter is described. The infrared emitter comprises an infrared source, a housing, and infrared optics. The infrared source emits electromagnetic radiation with a peak intensity at a radiation wavelength within the range of 2 to 15 microns. The housing has an aperture, and is arranged to house the infrared source. The infrared optics is arranged to direct the electromagnetic radiation emitted from the infrared source through the aperture to outside the housing.

20 Claims, 4 Drawing Sheets

LONG WAVE INFRARED EMITTER SYSTEMS

The inventive concepts disclosed herein generally relate to a long wave infrared emitter system.

BACKGROUND

Lighting is provided in numerous applications, including applications where the light is deployed in an outside, and sometimes adverse, environment. Applications for lighting in outside environments include, for example, airports, such as for airport maintenance and operations, enhanced vision systems (EVS), autonomous vehicles, such as automobiles and trucks, and unmanned aerial vehicles (UAVs).

Lighting in outside environments may be subjected to conditions which attenuate visible and near infrared (NIR) light. Such outside environmental conditions include smoke, dust, rain, snow and fog, for example. Radar provides electromagnetic irradiation which penetrates fog. Radar systems, however, are relatively expensive as compared to other sources of electromagnetic radiation. Further, radar does not provide as good an image as compared to other sources of electromagnetic radiation.

SUMMARY

In one aspect, embodiments of the inventive concepts disclosed herein are directed to an infrared emitter. The infrared emitter comprises an infrared source, a housing, and infrared optics. The infrared source emits electromagnetic radiation with a peak intensity at a radiation wavelength within the range of 2 to 15 microns. The housing has an aperture, and is arranged to house the infrared source. The infrared optics is arranged to direct the electromagnetic radiation emitted from the infrared source through the aperture to outside the housing.

In a further aspect, embodiments of the inventive concepts disclosed herein are directed to an infrared detection system. The infrared detection system comprises an infrared emitter and an infrared camera. The infrared emitter comprises an infrared source, a housing and infrared optics. The infrared source emits electromagnetic radiation with a peak intensity for a radiation wavelength within the range of 2 to 15 microns. The housing has an aperture, and is arranged to house the infrared source. The infrared optics is arranged to direct the electromagnetic radiation emitted from the infrared source through the aperture. The infrared camera is configured to detect infrared electromagnetic radiation with a radiation wavelength within the range of 2 to 15 microns.

In a further aspect, embodiments of the inventive concepts disclosed herein are directed to an infrared signaling system. The infrared signaling system comprises a first infrared detection system and a second infrared detection system. Each of the infrared detection systems comprises an infrared emitter and an infrared camera. The infrared emitter comprises an infrared source, a housing and infrared optics. The infrared source emits electromagnetic radiation with a peak intensity for a radiation wavelength within the range of 2 to 15 microns. The housing has an aperture, and is arranged to house the infrared source. The infrared optics are arranged to direct the electromagnetic radiation emitted from the infrared source through the aperture. The infrared camera is configured to detect infrared electromagnetic radiation with a radiation wavelength within the range of 2 to 15 microns. The infrared camera of the first infrared detection system is arranged to detect infrared electromagnetic radiation from the infrared emitter of the second infrared detection system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding infrared emitters with an infrared source emitting with a peak intensity in the range of 2 to 15 microns provides a radiation source that is appropriate for signally other entities (such as ground-based or airborne vehicles or ground personnel) in adverse weather conditions such as fog, rain or snow. Radiation from the infrared source is not as strongly attenuated in such adverse conditions as incandescent lamps or LED-based lamps.

As compared to electromagnetic radiation emitters with sources with shorter wavelengths, such as visible or NIR lamps, the electromagnetic radiation from emitters with peak intensities for wavelengths in the 2-15 micron range, hereafter referred to as a long wavelength infrared (LWIR) source, are not as highly attenuated. Further, an LWIR source may operate at significantly lower temperatures (such as less than 250° C.) than an incandescent source (which often operate at a temperature in the neighborhood of 2800° K). Such a LWIR source, as a result, require relatively low power, such as less than 10 W, to provide a useful source at a much lower temperature.

Further, both the infrared source and the optics used therewith may be relatively inexpensive for a LWIR infrared emitter. For example, the infrared source may be a device operating at temperatures of a typical soldering iron (hot enough to burn a finger but not glowing cherry red). The collimating optics may be a simple parabolic reflector made of stamped or spun metal. The environmental window of the infrared emitter can be transparent to LWIR radiation. One relatively inexpensive choice for the environmental window may be silicon.

Thus, the infrared emitters according to the inventive concepts disclosed herein may have reduced power, temperature, and cost.

Figure 1:
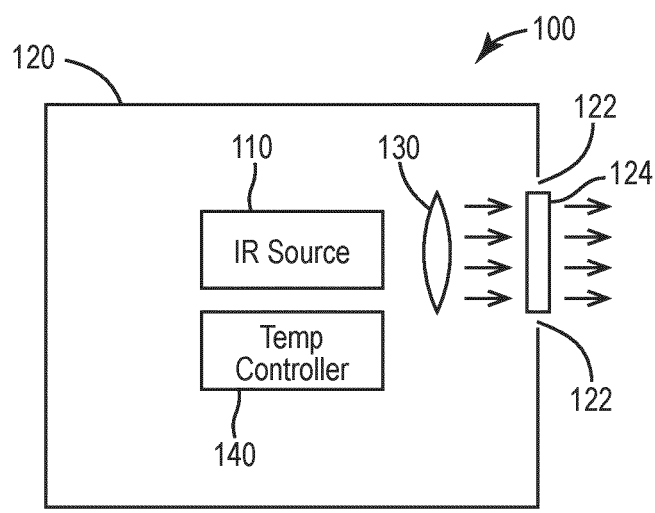
FIG. 1 is a schematic illustrating an infrared emitter according to embodiments of the inventive concepts disclosed herein.

FIG. 1 is a schematic illustrating an infrared emitter 100 according to embodiments of the inventive concepts disclosed herein. The infrared emitter 100 may include an infrared source 110, a housing 120, infrared optics 130, and possibly a window 124, for example.

The infrared source 110 emits electromagnetic radiation with a peak intensity at a radiation wavelength within the range of 2 to 15 microns, with the preferred range being 4 to 10 microns. The infrared source 110 may be heated to emit within a band of wavelengths. To this end, the infrared emitter 100 may further include a temperature controller 140 that is configured to heat the infrared source 110 to a temperature, such as in the range of 150° C. to 250° C., so that the peak intensity of radiation emitted by the infrared source 110 is within the preferred range of 4-10 microns. Thus, the infrared source may emit radiation in a similar fashion to a black body, where the specific spectra emitted depends on the temperature of the infrared source 110.

The infrared source 110 may include silicon nitride, for example. The infrared source 110 may be a similar to a soldering iron or a furnace igniter, for example, where the temperature of the igniter depends on the current flowing through the igniter material. In this regard, the temperature controller 140 may be configured to provide a current to the infrared source 110 to heat the infrared source 100 to a temperature as desired.

The housing 120 of the infrared emitter 100 is arranged to house the infrared source 110. The housing 120 may also house the temperature controller 140. Alternatively, the temperature controller 140 may be arranged outside of the housing 120.

The infrared optics 130 are arranged to direct electromagnetic radiation emitted from the infrared source 110 to the outside of the housing 120. In this regard, the housing 120 includes an aperture 122. The infrared optics 130 are arranged to direct electromagnetic radiation emitted from the infrared source 110 through the aperture 122 to the outside of the housing 120.

Figure 2:
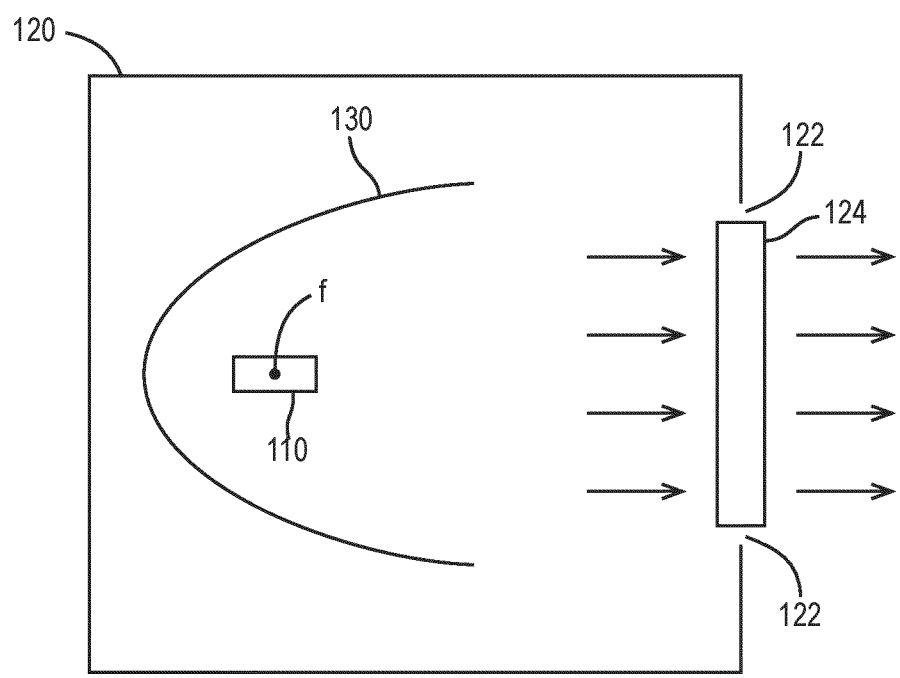
FIG. 2 is a side view illustrating the infrared source, housing with aperture and window, and infrared optics according to embodiments of the inventive concepts disclosed herein.

FIG. 2 is a side view illustrating the infrared source 110, housing 120 with aperture 122, infrared optics 130, and window 124. The infrared optics 130 may be structured to collimate the electromagnetic radiation emitted from the infrared source 110 and to direct the collimated electromagnetic radiation through the aperture 122. In this regard, the infrared optics 130 may have a mirror surface on the inside of the infrared optics 130 and have a parabolic shape, and the infrared source 110 may be disposed at a focal point f of the parabola.

The aperture 122 should be such that the electromagnetic radiation emitted from the infrared source 110 should pass through the aperture to the outside of the housing 120 without being substantially attenuated. The infrared emitter 100 may include a window 124 in the aperture which is transparent to the electromagnetic radiation emitter by the infrared source 110. The window 124 may be, for example, silicon.

The window 124 may be arranged in the aperture 122 to protect the infrared optics 130 and infrared source 110 from the outside environment. In this regard, the window 124 may be sealed within the aperture 122.

The infrared optics 130 may be reflective optics and/or refractive optics. The reflective optics may include mirrors, for example, while the refractive optics may include lenses. The lenses should be formed of a material substantially transparent to the electromagnetic radiation emitter by the infrared source 110. The lenses made be made of silicon for example.

The infrared optics 130 may be made of a material which is reflective to the electromagnetic radiation emitter by the infrared source 110. The infrared optics 130 may be made of metal, such as steel or aluminum, for example. The infrared optics 130 may be made of stamped metal or spun metal, for example.

The infrared emitter 100 according to the inventive concepts disclosed herein may be particular beneficial in environments where visible and NIR electromagnetic radiation has a relatively high attenuation. For example, in environments where the electromagnetic radiation from the infrared emitter 100 must pass through fog, for example, where visible and NIR light may be much more highly attenuated.

Further, the emitter 100 according to the inventive concepts disclosed herein may provide electromagnetic radiation with good transmission in fog conditions, while at the same time being low power, low temperature, and low cost.

Figure 3:
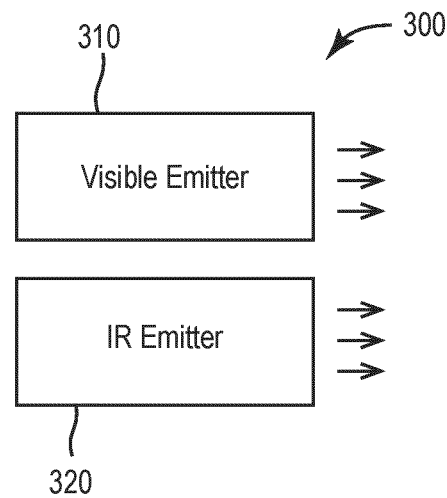
FIG. 3 is a schematic illustrating a visible light and infrared emitter according to embodiments of the inventive concepts disclosed herein.

FIG. 3 illustrates a visible light and infrared emitter 300 according to embodiments of the inventive concepts disclosed herein. The visible light and infrared emitter 300 includes a visible emitter 310 and an infrared emitter 320. The visible emitter 310 and the infrared emitter 320 are separate from each other, and emit radiation within different radiation bands. The infrared emitter 320 may be the infrared emitter 100 described with respect to FIGS. 1 and 2, for example.

The visible light emitter 310 emits light in the visible. The visible light emitter 310 may be a light emitting diode (LED), for example. Alternatively, the visible light emitter 310 may be an incandescent light, for example.

Figure 4:
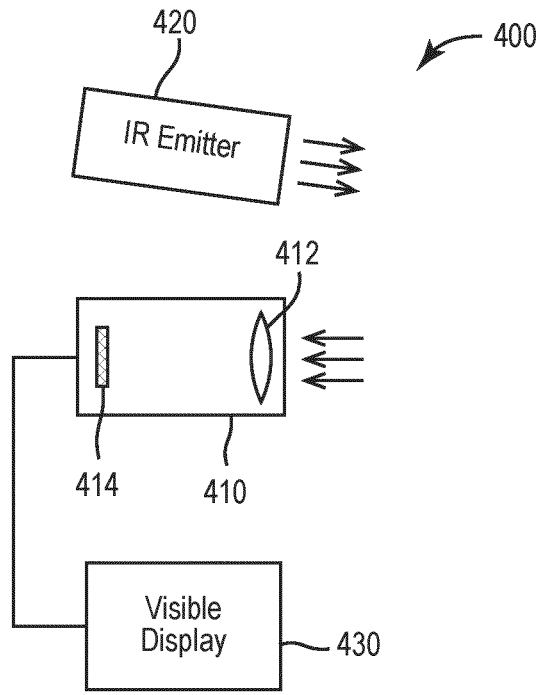
FIG. 4 is a schematic illustrating an infrared detector system according to embodiments of the inventive concepts disclosed herein.

FIG. 4 illustrates an infrared detection system 400 according to embodiments of the inventive concepts disclosed herein. The detection system 400 includes an infrared camera 410 and an infrared emitter 420. The infrared emitter 420 may be the infrared emitter 100 described with respect to FIGS. 1 and 2, for example. The infrared optics 130 (see FIGS. 1 and 2), are arranged to direct electromagnetic radiation emitted from the infrared source 110 through the aperture 122 (see FIGS. 1 and 2) to outside the housing 120 (see FIGS. 1 and 2).

Referring to FIG. 4, the infrared camera 410 is configured to detect infrared electromagnetic radiation with a radiation wavelength within the range of 2 to 15 microns. Thus, the infrared emitter 420 is arranged to provide infrared radiation, and the infrared camera 410 is arranged to detect infrared radiation from some source of infrared radiation. The infrared camera 410 may include imaging optics 412 which images infrared radiation onto a detector array 414.

The infrared detection system 400 may further include a visible light display 430 which displays an image based on the infrared radiation detected by the infrared camera 410.

Figure 5:
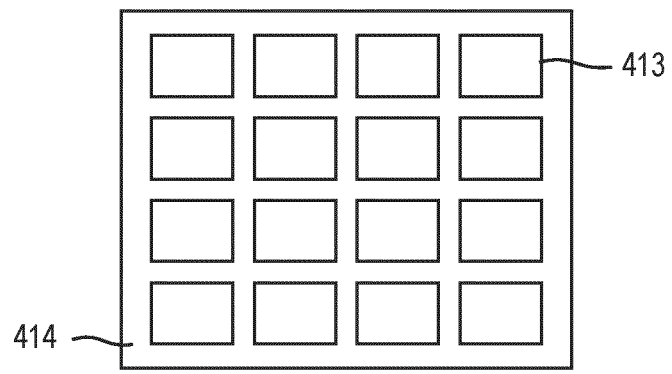
FIG. 5 is top view illustrating a detector array of an infrared camera according to embodiments of the inventive concepts disclosed herein.

FIG. 5 illustrates the detector array 414 with an array of detector elements 413, which detect infrared radiation. The detector elements 413 may be, for example, microbolometers. The microbolometers may be uncooled, for example. Alternatively, the microbolometers may be cooled.

The imaging optics 412 may be reflective optics and/or refractive optics. The reflective optics may include mirrors, for example, while the refractive optics may include lenses. The lenses should be formed of a material substantially transparent to the electromagnetic radiation emitter by the infrared source 110. The lenses made be made of silicon for example.

The infrared camera 410 may be separated from the infrared emitter 420, and may be a part of a head worn display, for example. Alternatively, the infrared camera 410 may be integral with the infrared emitter 420.

Figure 6:
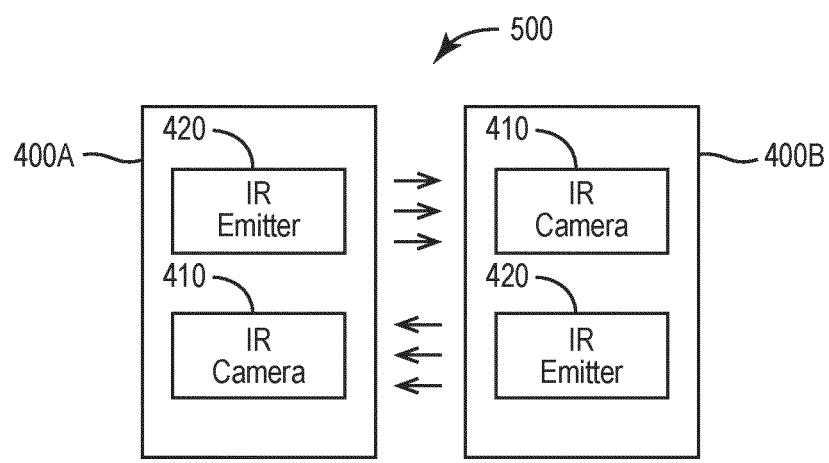
FIG. 6 is a schematic illustrating an infrared signaling system according to embodiments of the inventive concepts disclosed herein

FIG. 6 illustrates an infrared signaling system 500 according to embodiments of the inventive concepts disclosed herein. The infrared signaling system 500 includes a first infrared detection system 400A and a second infrared detection system 400B. Each of the first infrared detection system 400A and the second infrared detection system 400B may be a detection system 400 as described with respect to FIGS. 4 and 5.

The infrared camera 410 of the first infrared detection system 400A is arranged to detect infrared electromagnetic radiation from the infrared emitter 420 of the second infrared detection system 400B. Thus, the second infrared detection system 400B may signal the first infrared detection system 400A via the infrared electromagnetic radiation emitted from the infrared emitter 420 of the second infrared detection system 400B.

Further the infrared camera 410 of the second infrared detection system 400B may be arranged to detect infrared electromagnetic radiation from the infrared emitter 420 of the first infrared detection system 400A. Thus, the first infrared detection system 400A may signal the second infrared detection system 400B via the infrared electromagnetic radiation emitted from the infrared emitter 420 of the first infrared detection system 400A.

Figure 7:
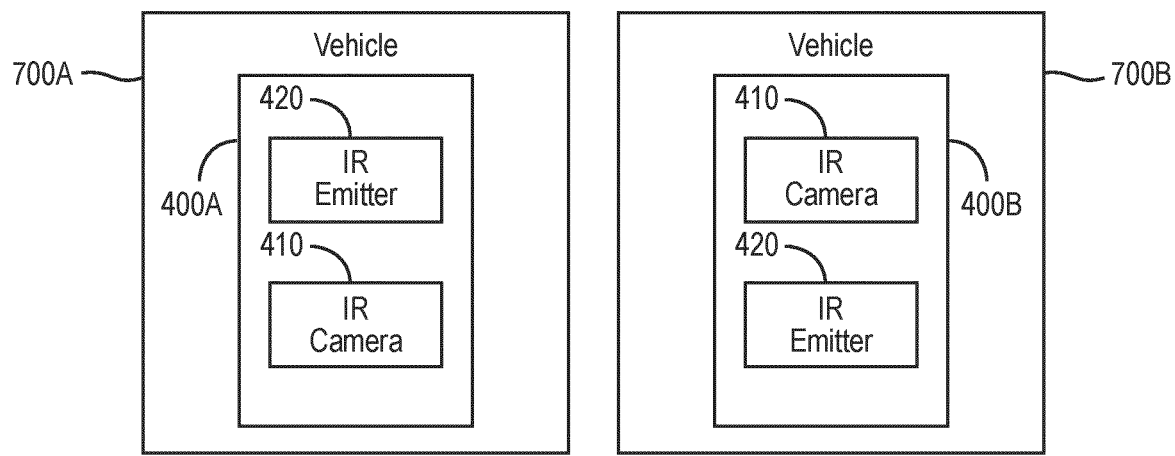
FIG. 7 is a schematic illustrating an application where infrared detector systems are mounted on a vehicle according to embodiments of the inventive concepts disclosed herein.

FIG. 7 illustrates an application where the first infrared detection system 400A is mounted on a first vehicle 700A, and the second infrared detection system 400B is mounted on a second vehicle 700B. Collectively, the first infrared detection system 400A and the second infrared detection system 400B comprise the infrared signaling system 500 (see FIG. 6). The vehicles 700A and 700B each may be a ground vehicle, or an aircraft, for example. The vehicles 700A and 700B each may be a manned vehicle or an unmanned vehicle, for example. The vehicles 700A and 700B may each be an autonomous vehicle, such as an automobiles, or truck, trucks, or a UAV.

The vehicles 700A and 700B with respective infrared detection systems 400A and 400B, allows for vehicle operators of the vehicles to signal each other in the environment of the vehicles 700A and 700B, and thus to navigate within the environment. Further, the infrared detection systems 400A and 400B in the vehicles according to the inventive concepts disclosed herein may provide electromagnetic radiation with good transmission in fog conditions. Thus, vehicles 700A and 700B may have improved navigation capabilities in adverse weather conditions such as fog where visible light has relatively high attenuation. The improved navigation capabilities are not limited to fog conditions, but in general to environments where visible and NIR light is highly attenuated, but LWIR is not.

Figure 8:
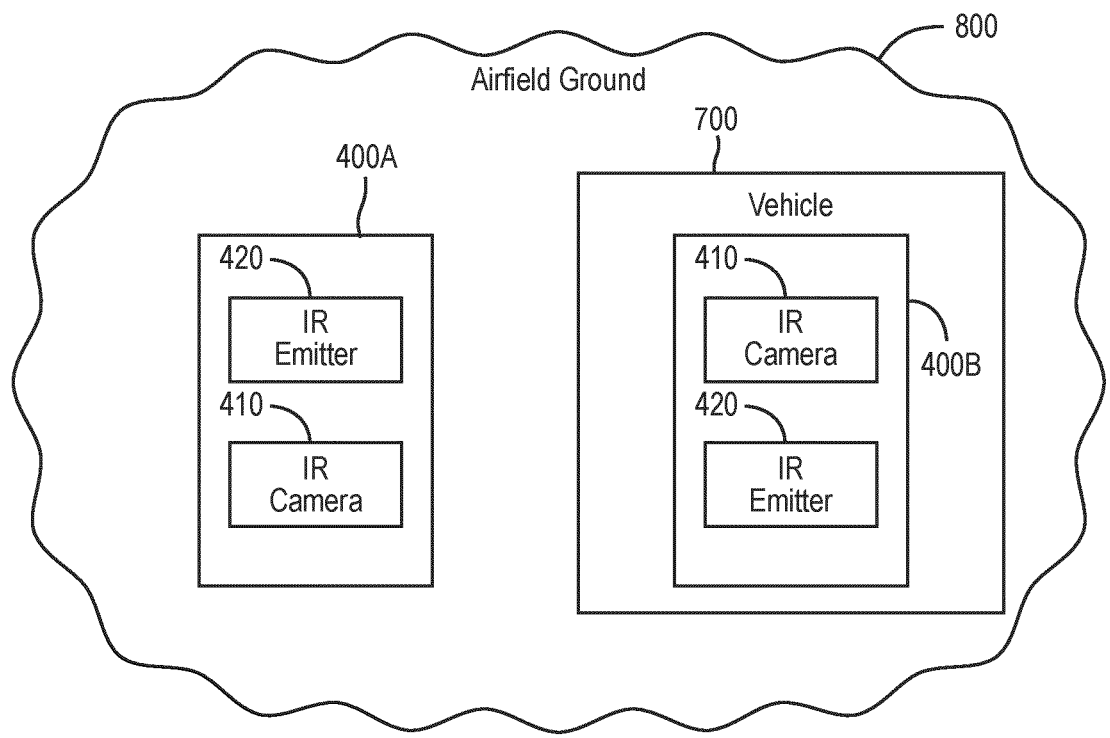
FIG. 8 is a schematic illustrating an application where infrared detector systems are disposed on the ground of an airfield and on a vehicle according to embodiments of the inventive concepts disclosed herein.

FIG. 8 illustrates an application where the first infrared detection system 400A is disposed on the ground, such as on the ground 800 of an airfield, and the second infrared detection system 400B is disposed on a vehicle, such as on a ground or air vehicle 700. Collectively, the first infrared detection system 400A and the second infrared detection system 400B comprise the infrared signaling system 500 (see FIG. 6). The infrared detection systems 400A and 400 B allow for a member of an operations crew and a vehicle operator to signal each other in the environment of the airfield. The infrared detection systems 400A and 400B according to the inventive concepts disclosed herein may provide signaling with good transmission in fog conditions. Thus, the operations crew and vehicle operator may have improved signaling in adverse weather conditions such as fog where visible and NIR light has relatively high attenuation. The improved signaling is not limited to fog conditions, but in general to environments where visible and NIR light is highly attenuated, but MWIR and LWIR is not.

Embodiments of the inventive concepts disclosed herein regarding infrared emitters with an infrared source emitting with a peak intensity in the range of 2 to 15 microns provides a radiation source that is appropriate for signally other entities (such as ground-based or airborne vehicles or ground personnel) in adverse weather conditions such as fog, rain or snow. Radiation from the infrared source is not as strongly attenuated in such adverse conditions as incandescent lamps or LED-based lamps.

As compared to electromagnetic radiation emitters with sources with shorter wavelengths, such as visible or NIR lamps, the electromagnetic radiation from emitters with peak intensities for wavelengths in the 2-15 micron range, hereafter referred to as a long wavelength infrared (LWIR) source, are not as highly attenuated. Further, an LWIR source may operate at significantly lower temperatures (such as less than 250° C.) than an incandescent source (which often operate at a temperature in the neighborhood of 2800° K). Such a LWIR source, as a result, require relatively low power, such as less than 10 W, to provide a useful source at a much lower temperature.

Further, both the infrared source and the optics used therewith may be relatively inexpensive for a LWIR infrared emitter. For example, the infrared source may be a device operating at temperatures of a typical soldering iron (hot enough to burn a finger but not glowing cherry red). The collimating optics may be a simple parabolic reflector made of stamped or spun metal. The environmental window of the infrared emitter can be transparent to LWIR radiation. One relatively inexpensive choice for the environmental window may be silicon.

Thus, the infrared emitters according to the inventive concepts disclosed herein may have reduced power, temperature, and cost.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. An infrared detection system comprising:
    an infrared emitter comprising:
        an infrared source emitting electromagnetic radiation with a peak intensity for a radiation wavelength within the range of 2 to 15 microns;
        a housing, having an aperture, and arranged to house the infrared source;
        infrared optics arranged to direct the electromagnetic radiation emitted from the infrared source through the aperture; and a temperature controller configured to heat the infrared source to a predetermined temperature within a range of 150° C. and 250° C. so that the infrared source emits the electromagnetic radiation with the peak intensity for the radiation wavelength within the range of 2 to 15 microns; and an infrared camera configured to detect infrared electromagnetic radiation with a radiation wavelength within the range of 2 to 15 microns, and arranged to directly receive the electromagnetic radiation directed by the infrared optics through the aperture, wherein the infrared source consumes 10 Watts of power or less to emit the electromagnetic radiation with the peak intensity for the radiation wavelength within the range of 2 to 15 microns that is detectable by the infrared camera.

2. The infrared detection system of claim 1, wherein the infrared optics includes a parabolic mirror with the infrared source arranged at a focus of the parabolic mirror.

3. The infrared detection system of claim 1, wherein the infrared optics collimate the electromagnetic radiation emitted from the infrared source, and direct the collimated electromagnetic radiation through the aperture.

4. The infrared detection system of claim 1, wherein the infrared optics include at least one of reflective optics or refractive optics.

5. The infrared detection system of claim 4, wherein the infrared optics include at least one of mirrors or lenses.

6. The infrared detection system of claim 1, wherein the infrared source emits electromagnetic radiation with a peak intensity at a radiation wavelength within the range of 4 to 10 microns.

7. The infrared detection system of claim 1, wherein the infrared source includes silicon nitride.

8. The infrared detection system of claim 1, wherein the infrared camera is configured to detect infrared electromagnetic radiation with a radiation wavelength within a range of 7 to 14 microns.

9. The infrared detection system of claim 1, wherein the infrared camera comprises an array of microbolometers.

10. The infrared detection system of claim 9, wherein the microbolometers are uncooled.

11. The infrared detection system of claim 1, wherein the infrared emitter further comprises a window transparent to the electromagnetic radiation within the range of 2 to 15 microns, and arranged within the aperture.

12. The infrared detection system of claim 11, wherein the window comprises silicon.

13. An infrared signaling system, comprising:
a first infrared detection system and a second infrared detection system,
each of the infrared detection systems comprising:
an infrared emitter comprising:
an infrared source emitting electromagnetic radiation with a peak intensity for a radiation wavelength within the range of 2 to 15 microns;
a housing, having an aperture, and arranged to house the infrared source;
infrared optics arranged to direct the electromagnetic radiation emitted from the infrared source through the aperture; and
a temperature controller configured to heat the infrared source to a predetermined temperature within a range of 150° C. and 250° C. so that the infrared source emits the electromagnetic radiation with the peak intensity for the radiation wavelength within the range of 2 to 15 microns; and
an infrared camera configured to detect infrared electromagnetic radiation with a radiation wavelength within the range of 2 to 15 microns, and arranged to directly receive the electromagnetic radiation directed by the infrared optics through the aperture,
the infrared camera of the first infrared detection system arranged to detect infrared electromagnetic radiation from the infrared emitter of the second infrared detection system, and
the infrared camera of the second infrared detection system is arranged to detect infrared electromagnetic radiation from the infrared emitter of the first infrared detection system;
wherein the infrared source consumes 10 Watts of power or less to emit the electromagnetic radiation with the peak intensity for the radiation wavelength within the range of 2 to 15 microns that is detectable by the infrared camera.

14. The infrared signaling system of claim 13, wherein each of the infrared detection systems further comprises a window transparent to the electromagnetic radiation within the range of 2 to 15 microns, and arranged within the aperture.

15. The infrared detection system of claim 1, wherein the temperature controller is positioned within the housing.

16. The infrared detection system of claim 1, wherein the temperature controller is positioned outside of the housing.

17. The infrared signaling system of claim 13, wherein the temperature controller is positioned within the housing.

18. The infrared detection system of claim 13, wherein the temperature controller is positioned outside of the housing.

19. The infrared detection system of claim 1, wherein the infrared source experiences an atmospheric environment.

20. The infrared detection system of claim 13, wherein the infrared source experiences an atmospheric environment.

* * * * *